Aug. 25, 1964  D. MOSES  3,145,997
WORK GRIPPING CHUCK
Filed Feb. 28, 1962  2 Sheets-Sheet 1
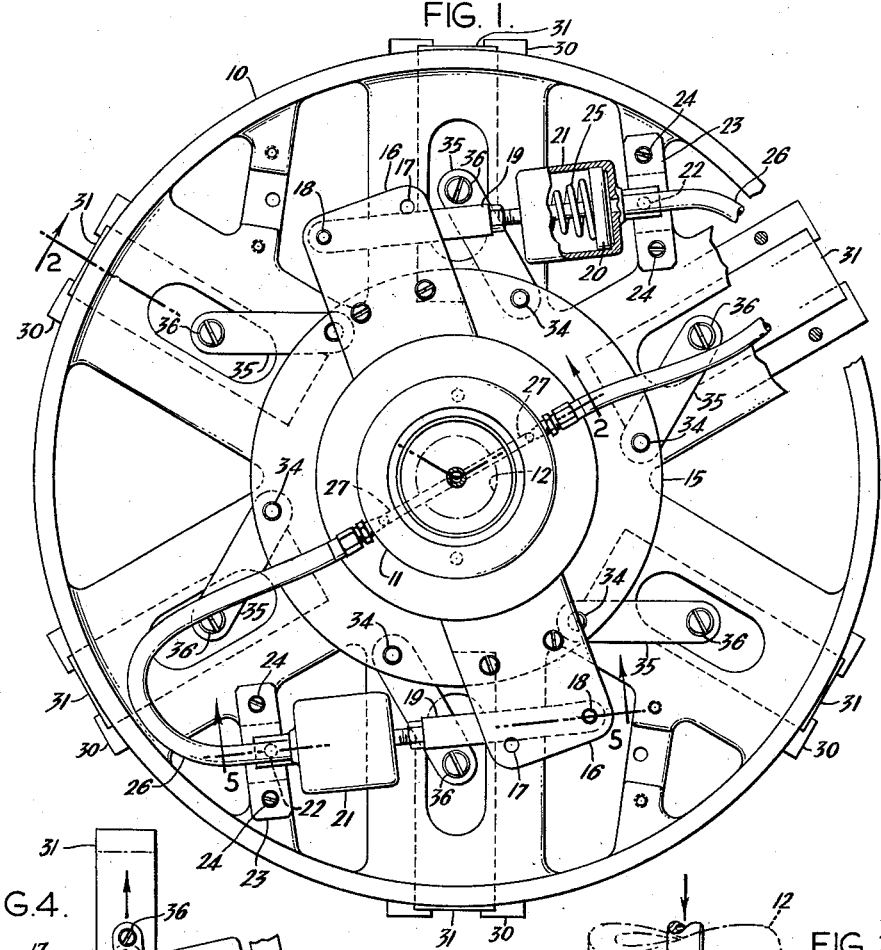
INVENTOR
DAVID MOSES
BY Howson & Howson
ATTYS.

Aug. 25, 1964  D. MOSES  3,145,997
WORK GRIPPING CHUCK
Filed Feb. 28, 1962  2 Sheets-Sheet 2
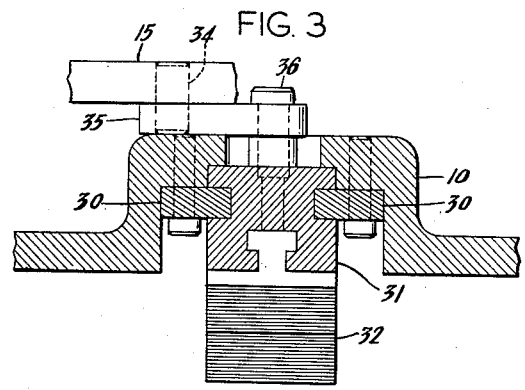
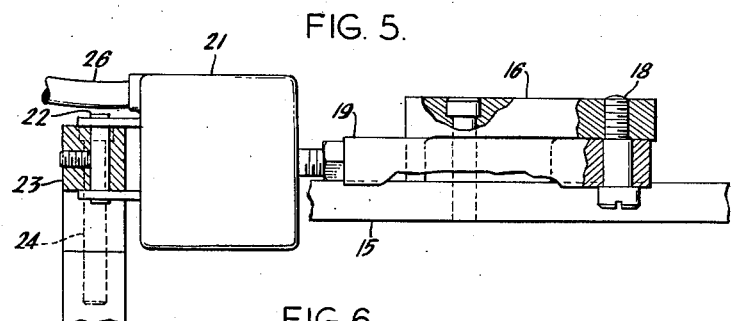
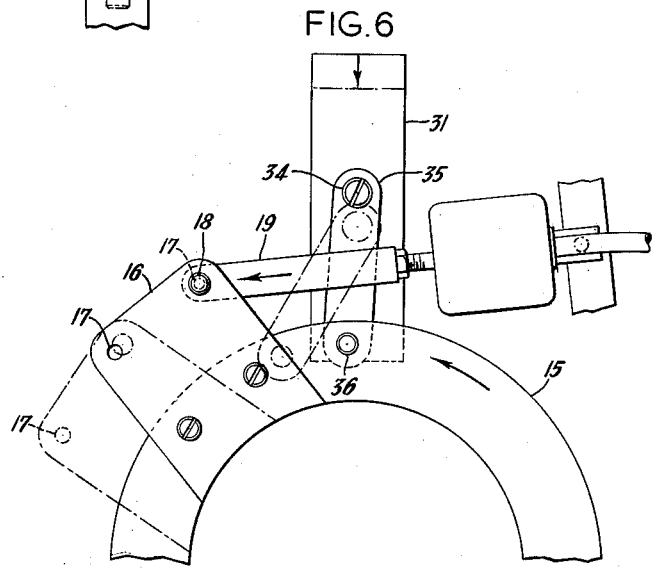
INVENTOR:
DAVID MOSES
BY Howson & Howson
ATTYS.

United States Patent Office 3,145,997
Patented Aug. 25, 1964

3,145,997
WORK GRIPPING CHUCK
David Moses, 1407 N. 8th St., Philadelphia, Pa.
Filed Feb. 28, 1962, Ser. No. 176,281
2 Claims. (Cl. 279—2)

This invention relates to a work gripping chuck and has for an object the provision of improvements in this art.

One of the particular objects of the invention is to provide a chuck which will grip the work strongly with a strong toggle-like movement.

Another object is to provide a chuck which can quickly be adjusted to grip either interiorly or exteriorly on the power stroke of a power operating device.

Another object is to provide a chuck which is formed of few, simple and rugged parts.

The above and other objects of the invention as well as certain features of novelty and advantages will be apparent from the following description of an exemplary embodiment, reference being made to the accompanying drawings wherein:

FIG. 1 is a vertical transverse section and elevation of a chuck embodying the invention, the section being taken from the rear of FIG. 2;

FIG. 2 is a vertical axial section taken on the line 2—2 of FIG. 1;

FIG. 3 is a section taken on the line 3—3 of FIG. 2;

FIG. 4 is a detail elevation like part of FIG. 1 but showing the parts in gripping position;

FIG. 5 is a section taken on the line 5—5 of FIG. 1; and

FIG. 6 is a view similar to FIG. 4 but showing the parts shifted to grip exteriorly.

The present chuck is designed for holding workpieces in a lathe and for gripping either interiorly or exteriorly by a simple adjustment which can be quickly made and without requiring any exchange of parts.

A face plate 10 is mounted on an enlarged fitting 11 of a shaft 12 and is retained by a plate 13 and screws 14. A turnable ring 15 is mounted on the rear of the face plate 10 and carries one or more radially projecting arms 16 with spaced power connection holes 17. At a hole 17, by a pin 18, there is connected a length-adjustable operating rod 19 connected to a piston 20 operating in a cylinder 21 pivoted at 22 to a base 23 secured to the back of the face plate, as by set screws 24.

The piston 20 is urged toward retracted position by a spring 25 and the piston is moved to gripping position by fluid pressure applied through a fluid line 26 connecting with a fluid channel 27 of the shaft 12.

The face plate 10 is provided with a plurality of radial guides 30 in which the slides 31 of workpiece gripping jaws 32 operate.

The slide 31 of each jaw is connected to a pivot pin 34 of the turnable ring 15 by a connecting link or rod 35, a pivot pin 36 forming the connection of the link 35 with the jaw slide 31. The links 35 are adapted to grip the work when they are substantially on dead center position (FIG. 4) so they act as toggle links and may be referred to as such.

In the form of FIGS. 1–5 the links 35 are on or near dead center position only for gripping workpieces interiorly as the jaws move outward and this gripping position can be adjusted to vary the gripping action, as by varying the length of the piston rod. By shifting the position of the pivot pin 18 between spaced holes 17 of the arms, the gripping action of the piston on its power stroke can be changed from interior grip, as shown in FIG. 4, to exterior grip, as shown in FIG. 6. Here, again, it is possible to make adjustments of the clamping position.

In operation, when the piston is moved out against the spring it turns the ring 15 to move all of the toggle links 35 which, in turn, moves all of the jaws radially.

When gripping inwardly, i.e., on the outer surface of a workpiece, the links 35 are initially located in a position generally parallel to the radial guides 30 and when in clamping position are slightly inclined from the radial position. The clamping action is still very powerful.

The present arrangement with one or more fluid actuating cylinders mounted on the chuck head it is necessary to have only a simple rotating fluid connection. The arrangement makes it easy to mount a cylinder or cylinders and does not involve complicated operating connections, as have been usual heretofore. Also since the power device is mounted on the chuck head no precise alignment is necessary between the chuck and power source every time the chuck is changed. In commercially available machines the changing of chucks is a delicate and time consuming job.

It is thus seen that the invention provides a simple and inexpensive chuck mechanism which will grip parts as strongly as desired by an adjustable toggle action.

While one embodiment has been described for purposes of illustration it is to be understood that there may be various embodiments and modifications within the scope of the invention.

I claim:

1. A work gripping chuck comprising a rotatable chuck head, a plurality of work gripping jaws mounted for movement radially relative to said chuck head, an operating ring mounted for rotation relative to said chuck head, a plurality of operating links corresponding in number to the number of said jaws, each operating link pivotally connected at one end to said ring and at its opposite end to one of said jaws, a power device connected to said ring operable to rotate said ring to effect movement radially outwardly of said jaws through said links from a retracted position to a work gripping position, and means for selectively adjusting said parts so that the links are substantially aligned radially with said jaws thereby to lock said jaws by said links when the power device reaches the end of its power stroke.

2. A work gripping chuck comprising a rotatable chuck head, a plurality of work gripping jaws mounted for movement radially relative to said chuck head, an operating ring mounted for rotation relative to said chuck head, a plurality of operating links corresponding in number to the number of said jaws, each operating link pivotally connected at one end to said ring and at its opposite end to one of said jaws, a cylinder-piston power device mounted on said head, a power operating rod actuated by said power device and having one end pivotally connected to said ring, said cylinder-piston device including a piston which is actuated by fluid in one direction to move said jaws radially outwardly to a work gripping position and normally biased in the opposite direction by resilient means to position said jaws in a retracted position and length adjusting means for said power operating rod whereby the parts can be adjusted to align said links substantially radially thereby to lock said jaws by said links when the power device reaches the end of its power stroke.

References Cited in the file of this patent
UNITED STATES PATENTS

| | | |
|---|---|---|
| 758,195 | Kraft | Apr. 26, 1904 |
| 1,321,739 | Haltman | Nov. 11, 1919 |
| 1,426,168 | Flick | Aug. 15, 1922 |
| 1,469,360 | Cullen | Oct. 2, 1923 |